United States Patent
Klofer et al.

(10) Patent No.: US 8,511,159 B2
(45) Date of Patent: Aug. 20, 2013

(54) ARRANGEMENT FOR FILL LEVEL MEASUREMENT

(75) Inventors: Peter Klofer, Steinen (DE); Winfried Mayer, Buch (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 685 days.

(21) Appl. No.: 12/457,799

(22) Filed: Jun. 22, 2009

(65) Prior Publication Data

US 2010/0000314 A1    Jan. 7, 2010

(30) Foreign Application Priority Data

Jun. 25, 2008  (DE) .......................... 10 2008 029 771

(51) Int. Cl.
*G01F 23/00*    (2006.01)

(52) U.S. Cl.
USPC ............ 73/290 V; 73/327; 324/637; 324/644; 342/73; 342/118

(58) Field of Classification Search
USPC .......... 73/290 V, 327; 342/124, 22, 73–103, 342/118, 125, 128–144; 324/600, 629, 637, 324/642, 644
See application file for complete search history.

(56) References Cited

U.S. PATENT DOCUMENTS

| | | | | |
|---|---|---|---|---|
| 5,504,490 A | * | 4/1996 | Brendle et al. ................. | 342/118 |
| 6,415,660 B1 | * | 7/2002 | Sinz et al. .................... | 73/290 R |
| 6,587,073 B2 | * | 7/2003 | Schiek et al. ................. | 342/124 |
| 7,075,479 B2 | * | 7/2006 | Andersson ..................... | 342/124 |
| 7,284,425 B2 | * | 10/2007 | Wennerberg et al. ........ | 73/290 V |
| 7,486,226 B2 | * | 2/2009 | Edvardsson ................... | 342/118 |
| 7,808,426 B1 | * | 10/2010 | Smith, Jr. ...................... | 342/123 |
| 7,861,600 B2 | * | 1/2011 | Mayer et al. ..................... | 73/861 |
| 2007/0214880 A1 | * | 9/2007 | Spanke et al. ............. | 73/290 V |
| 2010/0000314 A1 | * | 1/2010 | Klofer et al. ................ | 73/290 V |
| 2010/0018309 A1 | * | 1/2010 | Marcovecchio et al. ... | 73/290 V |
| 2011/0109496 A1 | * | 5/2011 | Van Den Berg ............. | 342/124 |

FOREIGN PATENT DOCUMENTS

| | | |
|---|---|---|
| DE | 28253 | 4/1960 |
| EP | 1 431 724 | 6/2004 |

* cited by examiner

*Primary Examiner* — Hezron E Williams
*Assistant Examiner* — Hoang Nguyen
(74) *Attorney, Agent, or Firm* — Bacon & Thomas, PLLC

(57) ABSTRACT

An arrangement for measuring fill levels of fill substances located in containers with a single fill-level measuring device operating according to the travel time principle, and arranged removed from the measuring locations at which a fill level is to be measured and having an antenna for directed sending of microwaves and for receiving microwaves. The arrangement includes: a mirror arrangement, which has, arranged at a measuring location above the fill substance, at least one mirror, which transmits, to the surface of the fill substance, microwaves sent from the antenna in their transmission direction and which transmits, back to the antenna, their echoes reflected on the surface of the fill substance; and a measuring device electronics, which is fed, in measurement operation, received signals received with the antenna, and which, on the basis of the received signals, ascertains the travel times of the microwaves reflected at the measuring locations on the surface of the fill substance and ascertains therefrom, on the basis of the positions of the mirrors arranged above the fill substance at the measuring locations, the fill levels at the measuring locations.

3 Claims, 6 Drawing Sheets

ARRANGEMENT FOR FILL LEVEL MEASUREMENT

TECHNICAL FIELD

The invention relates to an arrangement for measuring fill levels of fill substances located in containers using a fill-level measuring device operating according to the travel time principle, wherein, in measurement operation, the measuring device sends microwaves, receives their echoes reflected on the surface of the fill substance back after a travel time dependent on the fill level to be measured, and, on the basis of the travel time, ascertains the fill level.

BACKGROUND DISCUSSION

Such contactlessly working measuring devices are applied in a number of branches of industry, e.g. in the processing industry, in the various industrial applications of chemistry and in the foods industry.

FIG. 1 shows such an arrangement for fill level measurement, such as it is today typically applied. In such case, the fill substance 1 is located in a container 3, on which the fill-level measuring device 5 working with microwaves according to the travel time principle is arranged. The fill-level measuring device 5 includes an antenna 7, via which microwaves generated by a measuring device electronics 9 are sent and their echoes reflected on the surface of the fill substance are received back, after a travel time dependent on the fill level, and fed to the measuring device electronics 9. The measuring device electronics 9 ascertains the associated travel time and calculates therefrom, on the basis of the propagation velocity of the microwaves and the installation height of the measuring device 5, the fill level.

There are a number of applications in which the fill-level measuring device, or its antenna, cannot be arranged directly over the fill substance. An example of this are applications, in which, above the fill substance, very demanding environmental conditions reign, which the antenna, or the measuring device, especially its electronic components, cannot withstand. Thus, for example, in the case of containers filled with very hot fill substances, e.g. molten metals, there can occur above the fill substance enormously high temperatures, which would, within a very short time, lastingly damage, or even completely destroy, the measuring device, or its antenna. Further examples include applications with very large vapor, or dust, development. Both vapor and dust deposit on the antenna and lead to significant degrading of the transmitting and/or receiving characteristics of the measuring device.

Further examples include applications, in which fill levels at two or more measuring locations spatially separated from one another are to be measured with a single fill-level measuring device.

SUMMARY OF THE INVENTION

It is an object of the invention to provide, for fill level measurement with a fill-level measuring device operating with microwaves according to the travel time principle, an arrangement, with which it is possible to arrange the fill-level measuring device removed from at least one measuring location, at which a fill level is to be measured with the fill-level measuring device.

For this, the invention resides in an arrangement for measuring fill levels of fill substances located in containers at least one predetermined measuring location, including arranged removed from the measuring location, or the measuring locations, and operating with microwaves according to the travel time principle, a fill-level measuring device having an antenna for directed sending of microwaves and for receiving of microwaves, a mirror arrangement,
   which has at least one mirror arranged at a measuring location above the fill substance, and
   which transmits onto the surface of the fill substance, at the measuring locations, microwaves sent from the antenna in its transmission direction, and which transmits back to the antenna their echoes reflected on the surface of the fill substance, and a measuring device electronics,
   to which are fed, in measurement operation, signals received with the antenna, and
   which, on the basis of the received signals, ascertains the travel times of the microwaves reflected at the measuring locations on the surface of the fill substance and therefrom, on the basis of the positions of the mirrors arranged above the fill substance, ascertains current fill levels at the measuring locations.

In a first embodiment, the antenna is arranged outside the container, above the fill substance, and oriented in such a manner, that it radiates, in measurement operation, microwaves in a transmission direction, which extends out over the surface of the fill substance. The mirror arrangement includes a single mirror arranged at the measuring location above the fill substance, on which, in measurement operation, the microwaves radiated in the transmission direction impinge. The mirror is arranged inclined relative to the transmission direction in such a manner, that microwaves impinging on the mirror in the transmission direction are reflected from the mirror at the measuring location onto the surface of the fill substance, and their echoes reflected on the surface of the fill substance are transmitted by the mirror back to the antenna.

In a second embodiment
   the mirror arrangement includes at least two mirrors,
     of which one is a deflecting mirror arranged in the transmission direction of the antenna, and
     of which another is a mirror arranged at the measuring location above the fill substance,
   wherein the mirrors, by their orientations, provide beam guidance for the microwaves, by which microwaves emitted from the antenna are reflected onto the surface of the fill substance and their echoes reflected on the surface of the fill substance are reflected back to the antenna.

In a further development of the invention
the antenna has a transmission direction, which extends out over the fill substance,
the mirror arrangement includes at least one mirror partially transmissive for microwaves and arranged along an axis defined by the transmission direction at a measuring location above the fill substance and an additional mirror arranged in the transmission direction behind the one or more partially transmissive mirrors at an additional measuring location above the fill substance, and
the one or more partially transmissive mirrors and the additional mirror have an orientation, by which in the transmission direction thereon impinging thereon reflected microwaves are radiated in the direction of the fill substance, and echoes reflected on the surface of the fill substance back to the mirrors are radiated from the mirrors counter to the transmission direction in the direction of the antenna.

In an additional further development
the mirror system includes
- a deflecting mirror, which turns microwaves transmitted from the antenna in their transmission direction to a beam direction, which extends out over the fill substance,
- at least one mirror partially transmissive for microwaves arranged at a measuring location above the fill substance along an axis defined by the beam direction, and
- an additional mirror arranged in the beam direction behind the one or more partially transmissive mirrors at an additional measuring location above the fill substance, and the one or more partially transmissive mirrors and the additional mirror have orientations, by which in beam direction thereon impinging thereon reflected microwaves are radiated in the direction of the fill substance, and by which echoes reflected on the surface of the fill substance back to the mirrors are radiated from the mirrors counter to the beam direction in the direction of the deflecting mirror, via which the microwaves impinging thereon counter to the beam direction are radiated counter to the transmission direction in the direction of the antenna.

In a further development of the invention
the antenna has a transmission direction, which extends out over the fill substance,
the mirror arrangement includes at least one mirror installed along the transmission direction at a measuring location above the fill substance in a beam path of the microwaves and covering a section of the beam path and an additional mirror arranged in the transmission direction behind the one or more mirrors covering the sections at an additional measuring location above the fill substance, and
the one or more mirrors covering the sections and the additional mirror have an orientation, by which in the transmission direction thereon impinging thereon reflected microwaves are radiated in the direction of the fill substance, and by which echoes reflected on the surface of the fill substance back to the mirrors are radiated from the mirrors counter to the transmission direction in the direction of the antenna.

In another further development
the mirror system includes
- a deflecting mirror, which turns microwaves transmitted from the antenna in their transmission direction to a beam direction, which extends out over the fill substance,
- at least one mirror installed along the beam direction at a measuring location above the fill substance in the beam path of the microwaves and covering a section of the beam path, and
- an additional mirror arranged in the beam direction behind the one or more mirrors covering a section of the beam path at an additional measuring location above the fill substance, the one or more mirrors covering the sections and the additional mirror have an orientation, by which in beam direction thereon impinging thereon reflected microwaves are radiated in the direction of the fill substance, and by which echoes reflected on the surface of the fill substance back to the mirrors are radiated from the mirrors counter to the beam direction in the direction of the deflecting mirror, via which the thereon counter to the beam direction impinging microwaves are radiated counter to the transmission direction in the direction of the antenna.

Additionally, the invention includes a method for operating an arrangement as defined in one of the further developments, wherein
microwaves are transmitted via the antenna,
the transmitted microwaves are divided via the mirror arrangement into a number of beam sections corresponding to the number of mirrors arranged at the measuring locations above the fill substance, and the beam sections then impinge at the measuring locations on the surface of the fill substance determined by the positions of the mirrors, and are reflected there,
echoes of the individual beam sections reflected at the measuring locations from the surface of the fill substance are fed via the mirror arrangement to the antenna,
on the basis of a received signal obtained by the antenna, travel times are ascertained, which the beam sections and their echoes require for the path from the antenna to the site on the surface of the fill substance corresponding to the measuring locations and back to the antenna, and
on the basis of these travel times and the positions of the mirrors arranged at the measuring locations above the surface of the fill substance, fill level at the measuring locations is ascertained.

In a further development, mirrors more remote from the antenna have larger mirror area than mirrors arranged nearer the antenna, wherein the distance between the antenna and a mirror equals the length of the path traveled by the sent microwaves on the path from the antenna to the mirror along the beam path predetermined by the mirror arrangement.

In an additional further development, the mirrors have a form, which effects focusing of microwaves reflected thereon.

In an additional further development, at least one mirror arranged over the surface of the fill substance includes at least one reference reflector, which reflects thereon impinging microwaves back, counter their direction of incidence.

In an embodiment of the two first further developments, the partially transmissive mirrors are metal mirrors, in which a microwaves transmissive window, especially an opening, is provided centrally.

The fill-level measuring device of the invention has the advantage, that the measuring device and its antenna can be arranged removed from the measuring locations, at which the fill levels are to be measured with the measuring device, at, within broad limits, freely selectable locations. Transmission of the microwaves to the one or more measuring locations is effected through the mirror arrangements. The mirror arrangements are insensitive relative to demanding environmental temperatures, high temperatures and moisture.

These environmental influences, which are damaging both for the measuring device as well as, thus, for the antenna, have practically no deleterious effect on the microwave-transmissive characteristics of the mirror arrangement.

BRIEF DESCRIPTION OF THE DRAWINGS

The invention and its advantages will now be explained in greater detail on the basis of the figures of the drawing, in which six examples of embodiments are presented; equal parts are provided in the figures with equal reference characters. The figures of the drawing show as follows.

DETAILED DISCUSSION IN CONJUNCTION WITH THE DRAWINGS

Figure 1:
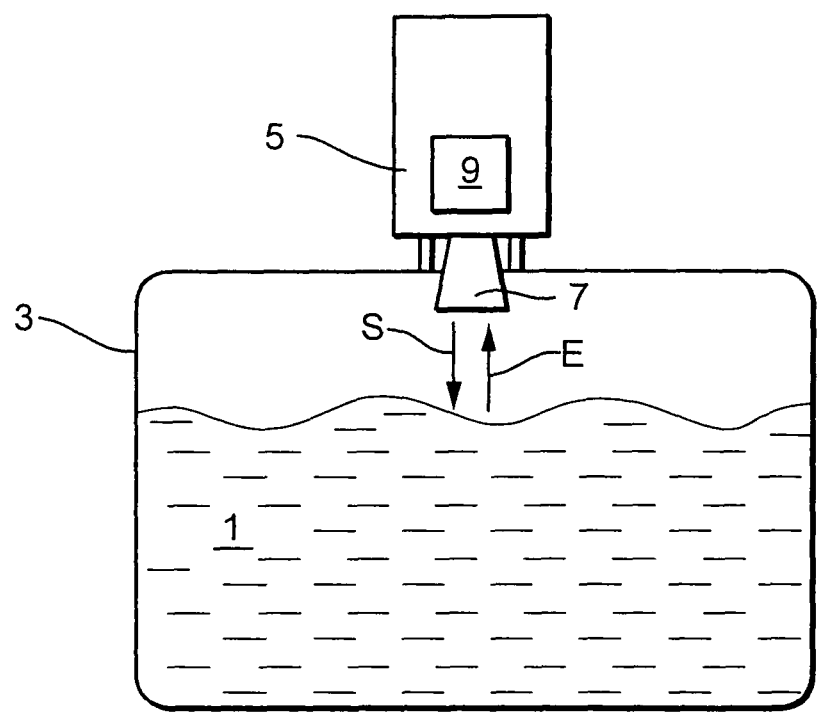
FIG. 1 a prior art arrangement for fill level measurement with a fill-level measuring device mounted on a container.
Figure 2:
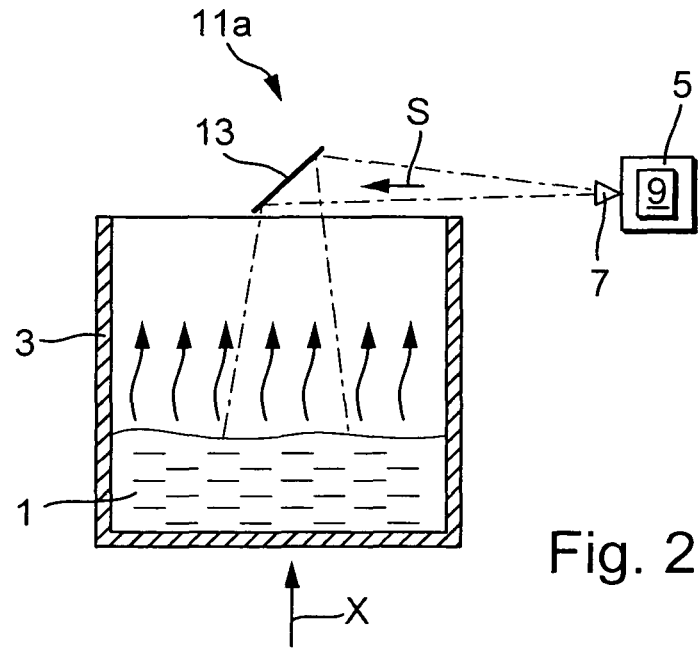
FIG. 2 an arrangement of the invention for fill level measurement with a mirror arrangement having a single mirror arranged above the fill substance in the transmission direction of the antenna.

FIG. 2 shows a first example of an embodiment of an arrangement of the invention for measuring fill levels of a fill substance 1 located in a container 3. The arrangement uses a conventional fill-level measuring device 5 working with microwaves according to the travel time principle. Fill level measuring devices 5 of this type are available, for example, from Endress+Hauser under the mark MICROPILOT. The fill-level measuring device 5 includes an antenna 7 for directed sending, and for receiving, of microwaves, and serves in measurement operation to transmit microwaves and to receive their echoes reflected on the surface of the fill substance after a travel time dependent on fill level.

In contrast to the state of the art, the fill-level measuring device 5 and, especially, its antenna 7 are arranged at some distance from the measuring location X, at which the fill level is to be measured.

When the fill-level measuring device 5, for the above recounted reasons, such as e.g. high temperatures reigning at the measuring location X, dust or vapor, cannot be arranged directly above the fill substance 1 in, or over, the container 3, it is preferably arranged completely outside the container 3, such as shown in FIG. 2.

The arrangement of the invention comprises a mirror arrangement 11, which is composed of one or more mirrors. Thereof, at least one mirror 13 is arranged at a measuring location X above the fill substance 1 in, or over, the container 3.

The mirror arrangement 11 transmits to the measuring locations X on the surface of the fill substance the microwaves sent from the antenna 7 in their transmission direction S and it transmits in reverse direction their echoes reflected on the surface of the fill substance back to the antenna 7. In measurement operation, the received signals obtained by the antenna 7 are fed to a measuring device electronics 9 of the fill-level measuring device 5. This ascertains, on the basis of the received signals, the travel times, which the microwaves require for the path, as determined by the mirror arrangement 11, the position of the antenna 7 and the fill level, from the antenna 7 to the surface of the fill substance and back, and derives therefrom on the basis of the position of the one or more mirrors 13 arranged above the fill substance 1 at the one or more measuring locations X, the associated fill levels.

For this, the measuring device electronics 9 derives, from the received signal, an echo function representing echo amplitudes as a function of travel time. Each value of this echo function gives the amplitude of an echo reflected at a certain distance along the path from the antenna 7, as determined by the positions of the antenna 7 and the mirror arrangement 11.

For determining the travel times, all known methods can be applied, which enable measurement of relatively short distances by means of reflected microwaves. The most well known examples are the pulse radar and frequency modulation continuous wave radar (FMCW radar) methods.

In the case of pulse radar, periodically, short microwave pulses are transmitted, which are reflected from the surface of the fill substance, and, after a distance dependent travel time, received back. The received signal amplitude as a function of time is given by the echo function. Each value of this echo function corresponds to the amplitude of an echo reflected at a certain distance from the antenna.

In the FMCW method, a continuous microwave is sent, which is frequency modulated, periodically and linearly, for example, according to a sawtooth function. The frequency of the received echoes signal has, consequently, relative to the instantaneous frequency, which the transmission signal has at the point in time of receipt, a frequency difference, which depends on the travel time of the echo signal. The frequency difference between transmission signal and received signal, which can be obtained by mixing both signals and evaluating the Fourier spectrum of the mixed signal, corresponds, thus, to the distance of the reflecting surface from the antenna. Additionally, the amplitudes of the spectral lines of the frequency spectrum obtained by the Fourier transformation frequency spectrum correspond to the echo amplitudes. This Fourier spectrum represents, consequently, in this case, the echo function.

From the echo function, at least one wanted echo is ascertained, which corresponds to the reflection of the transmission signal at the measuring location X on the surface of the fill substance. From the travel time of the wanted echo there results, in the case of known propagation velocity of the microwaves, directly, the path length, which the microwaves travel on their path, as determined by the mirror arrangement 11, from the antenna 7 to the surface of the fill substance and back. The fill-level measuring device 5 ascertains on the basis of these travel times and the position of the mirror 13 arranged at the respective measuring location X over the fill substance 1, the current fill level at this measuring location X.

Preferably, high-frequency microwaves, e.g. microwaves with a frequency of more than 60 GHz, are used, together with antennas 7 designed correspondingly for such frequencies. High frequencies offer the advantage that they permit achievement of a directional characteristic especially well suited for the application of the invention. Such directional characteristic is distinguished by a small angle of divergence of the transmitted microwave beams.

In the example of an embodiment illustrated in FIG. 2, the fill-level measuring device 5 is arranged laterally beside the container 3 at a height, which lies above the surface of the fill substance. The antenna 7 is oriented in such a manner, that it transmits microwaves in a transmission direction S, which extends above the fill substance 1 parallel to the surface of the fill substance, out over the surface of the fill substance.

The mirror arrangement 11a of FIG. 2 is composed of a single mirror 13 installed at the measuring location X above the fill substance 1 and arranged in the beam path. In measurement operation, the microwaves radiated in the transmission direction S impinge on the mirror 13. The mirror 13 is arranged inclined relative to the transmission direction S in such a manner, that it reflects microwaves impinging thereon in the transmission direction S essentially perpendicularly to the surface of the fill substance. The fill substance 1 reflects the incoming microwaves in the form of an echo back to the mirror 13. There, another reflection takes place, by which the echoes are transmitted from the mirror 13 back to the antenna 7.

Figure 3:
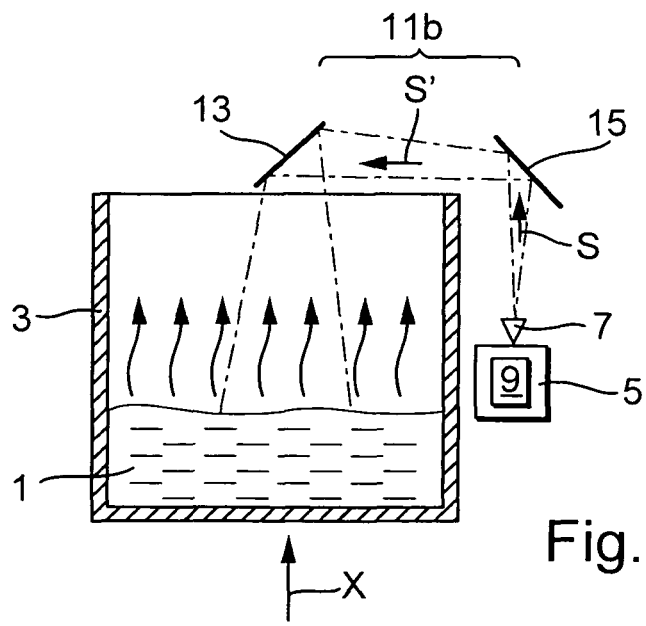
FIG. 3 an arrangement of the invention for fill level measurement with a mirror arrangement having a deflecting mirror arranged in the transmission direction of the antenna and a mirror arranged above the fill substance.

FIG. 3 shows a further example of an embodiment, which differs from the example of an embodiment illustrated in FIG. 2 by the transmission direction S of the antenna 7 and the corresponding embodiment of the mirror arrangement 11b.

The fill-level measuring device 5 and its antenna 7 are, also here, arranged outside the container 3. The antenna 7 has an orientation, in which the transmission direction S extends vertically (parallel to the surface normals to the surface of the fill substance). The mirror arrangement 11b includes a deflecting mirror 15 arranged in the transmission direction S of the antenna 7 above the antenna 7 and above the fill substance 1. Deflecting mirror 15 serves to deflect the sent microwaves into a beam direction S', which extends parallel to the surface of the fill substance above the fill substance 1, out over the container 3. This deflecting is achieved by an appropriate orientation of the deflecting mirror 15. The beam direction S' corresponds to the transmission direction S of the antenna 7 illustrated in FIG. 2. The mirror arrangement 11b includes, further, arranged at the measuring location X above the fill substance 1, the mirror 13, which, here, is inserted in the beam path determined by the beam direction S'.

In measurement operation, microwaves radiated from the antenna 7 in the transmission direction S are directed via the deflecting mirror 15 to the mirror 13, which, in turn, is arranged inclined relative to the beam direction S' in such a manner, that microwaves reflected on the mirror 13 at the measuring location X impinge almost perpendicularly on the surface of the fill substance. The fill substance 1 reflects these incoming microwaves in the form of an echo back to the mirror 13. The echoes are transmitted via a reflection on the mirror 13 and a reflection on the deflecting mirror 15 back to the antenna 7.

Also here, the fill level is ascertained on the basis of the travel time, which the microwaves require for the path defined by the mirror arrangement 11b, the position of the antenna 7 and the position of the surface of the fill substance, from the antenna 7 to the surface of the fill substance and back.

Of course, the fill-level measuring device 5 can also be arranged at other than the illustrated locations, outside the container 3, and the antenna 7 can have another orientation and therewith other than the illustrated transmission directions S. In such case, for example, between the deflecting mirror 15 installed in the transmission direction S and the mirror 13 arranged above the fill substance 1, other mirrors can be interposed, by which the microwaves incoming to the deflecting mirror 15 are directed to the mirror 13 arranged above the fill substance 1. The microwaves reflected on the surface of the fill substance travel via the particular mirror arrangement then in reverse direction and are reflected back through it to the antenna 7.

Preferably, the mirrors 13, 15 are planar mirrors, which are made, for example, of planar metal plates, e.g. of stainless steel. Planar mirrors are cost-effectively manufacturable and can be installed in simple manner.

Alternatively, also mirrors can be used, whose form effects a focusing of microwaves reflected therefrom. In this way, natural widening of the sent microwave beam on its path from the antenna 7 to the surface of the fill substance and back is counteracted. Mirrors of this type are applied for improving beam guidance, for example, in special applications, e.g. in the case of unfavorable environmental conditions, in the case of large distances to be covered by the microwaves, or in the case of little reflective ability of the surface of the fill substance. An example of an embodiment for this is presented in FIG. 4. The mirror 17 shown there is a metal, or a metal coated, parabolic screen, which reflects and focuses an incoming beam. A microwave beam impinging thereon in a direction of incidence I is radiated focused in an emergence direction A determined by the shape and orientation of the mirror 17. The same focusing effect arises naturally in the reverse beam direction, when a beam impinges on the mirror 17 from below, counter to the emergence direction A illustrated in FIG. 4, and is radiated focused to the left, counter to the direction of incidence I illustrated in FIG. 4. By this focusing of the microwaves, power loss is kept small.

In connection with mirror arrangements 11, which have two or more mirrors 13, 15, the dimensions of the mirrors 13, 15 are preferably selected in such a manner, that mirrors more remote from the antenna 7, such as the mirror 13 in FIG. 3, have a larger effective mirror area than mirrors arranged nearer to the antenna 7, here the deflecting mirror 15 of FIG. 3. In such case, the distance between the antenna 7 and the respective mirrors 13, 15 equals the path distance traveled by the sent microwaves on the path from the antenna 7 to the mirrors 13, 15 along the beam path determined by the mirror arrangement 11. In this way, the power loss, which occurs based on the beam widening arising along this path due to the angle of divergence of the sent microwave beams, can be reduced.

Preferably, the mirror 13 arranged at the measuring location X over the surface of the fill substance includes at least one reference reflector 19, which serves to reflect a small part TR of the microwaves falling on the mirror 13 directly back, counter to the direction of incidence I. The part TR reflected back counter to the direction of incidence I is guided via the mirror arrangement 11 back to the antenna 7 and effects a reference echo, which, due to its fixed travel time, can be detected in simple manner on the basis of the received signal. The reference echo and its travel time form, thus, a fixed reference point for ascertaining the echo reflected at the measuring location X on the surface of the fill substance and the travel time of such echo.

Figure 5:
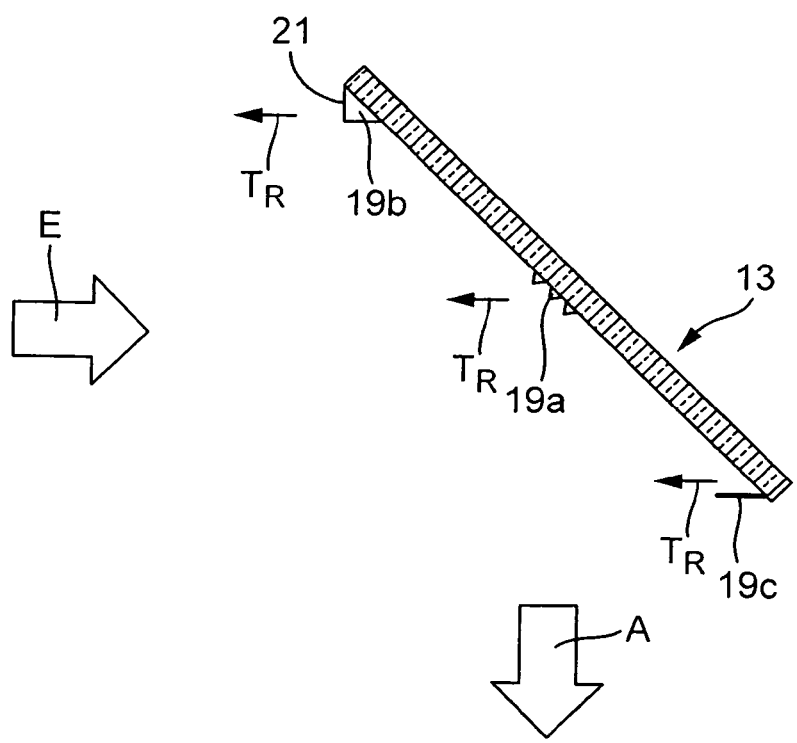
FIG. 5 a mirror equipped with reference reflectors.

FIG. 5 shows the mirror 13 with, by way of example, three types of reference reflectors 19a, 19b, 19c arranged thereon.

Reference reflector 19a arranged in the middle of the mirror 13 is formed by a mirror section, which has a rough surface, which effects a diffuse reflection. In the diffuse reflection, a part TR of the microwaves incoming in direction of incidence I onto the rough surface is reflected back antiparallel to the direction of incidence I.

Reference reflector 19b arranged on the upper edge of the mirror 13 includes a reflector surface 21, whose surface normal extends antiparallel to a direction of incidence I. Microwaves impinging on the reflector surface 21 in the direction of incidence I are reflected back antiparallel to the direction of incidence I.

Reflector 19c arranged on the lower edge of the mirror 13 is a retroreflector, such as is used e.g. in so-called cat's eyes. Retroreflectors are also known under the labels, corner reflector, back radiator, triple mirror or angle reflector. They are composed, as a rule, of three triangular mirror surfaces arranged perpendicular relative to one another, which are joined at a corner, such that incoming microwaves are reflected and radiated back, counter their direction of incidence I.

The invention offers the advantage, that the mirror arrangements 11 are, in the contrast to the fill-level measuring device 5 and its antenna 7, mechanically very robust and extremely temperature resistant. A further advantage of the mirror arrangement 11 is that the guidance of the microwaves effected by the mirror arrangement 11 is, in high measure, insensitive to impurities, such as e.g. dust, and to moisture, e.g. in the form of vapor and or condensate.

There are applications in the case of which different fill levels can be present at different locations in a container. Examples include containers, e.g. tanks or vessels, which are arranged on movable, or swaying, supports. Examples also include bulk goods containers, in which the bulk good, fill substance 1, can have a conical, upper surface.

Figure 6:
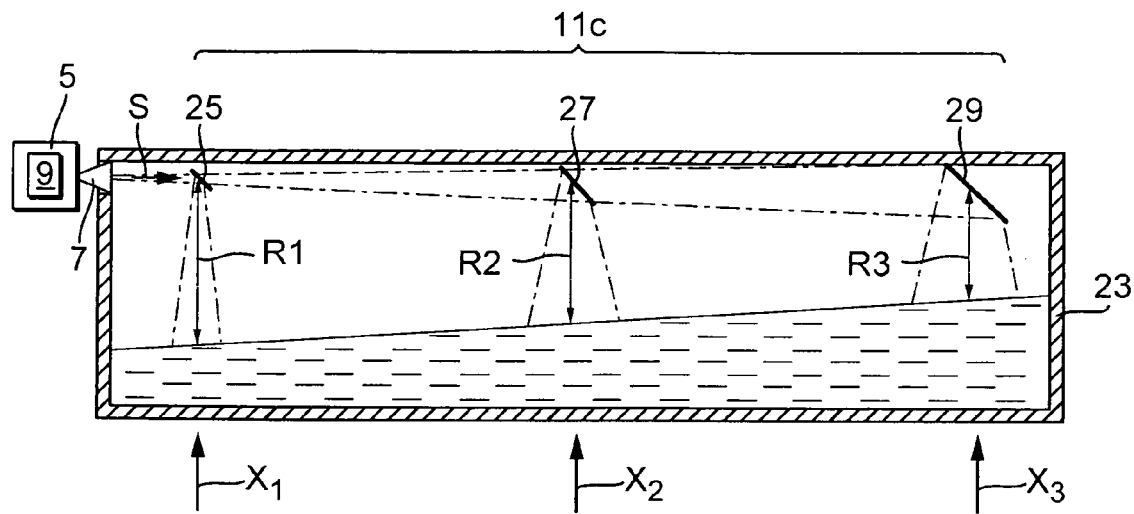
FIG. 6 an arrangement of the invention equipped with partially transmissive mirrors, with which fill levels are measurable at different measuring locations.

FIG. 6 shows a further development of the arrangement of the invention for fill level measurement, with which it is possible to measure, with a single fill-level measuring device 5 arranged removed from the measuring locations X1, X2, X3, the fill levels at the different measuring locations X1, X2, X2. In this regard, also here, a mirror arrangement 11c is used, which transmits the microwaves sent by the antenna 7 from the antenna 7 to the different measuring locations X1, X2, X3 in the container 23 and transmits back to the antenna 7 their echoes reflected at the respective locations X1, X2, X3 on the surface of the fill substance.

In the case of the example of an embodiment illustrated in FIG. 6, the antenna 7 is arranged externally on the container 23 at a height above the fill substance 1 and has a transmission direction S, which extends above the fill substance 1 out over the fill substance 1. The shown mirror arrangement 11c comprises two mirrors 25, 27 arranged one after the other along an axis defined by the transmission direction S. The mirrors are partially transmissive for microwaves and are situated at measuring location X1, X2, respectively, above the fill substance 1. To the extent required, e.g. based on the size of the container 23 and/or the number of locations, at which the fill level is to be measured, and to the extent that the measuring dynamic of the fill-level measuring device 5 permits, still other partially transmissive mirrors can be arranged along this axis. Behind the, as seen in the transmission direction S, last partially transmissive mirror 27, there is arranged, at an additional measuring location X3, an additional mirror 29 above the fill substance 1.

The partially transmissive mirrors 25, 27 and the additional mirror 29 have an orientation, by which in the transmission direction S thereon falling and thereon reflected microwaves are radiated to the measuring locations X1, X2, X3 in the direction of the fill substance 1. At the surface of the fill substance, there occurs then in each case a reflection, by which microwaves are reflected back to the mirrors 25, 27, 29. The mirror 25, 27, 29, respectively, radiate these back reflected echoes then, in turn, counter to the transmission direction S, in the direction of the antenna 7.

Figure 7:
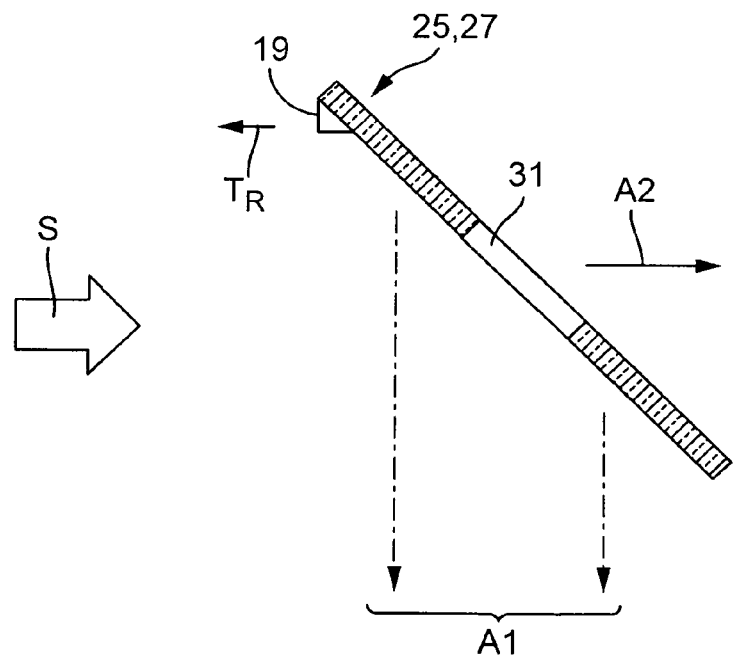
FIG. 7 a partially transmissive mirror.

The partially transmissive mirrors 25, 27 can be, for example, metal mirrors, which have a window 31 transmissive for microwaves. An example of an embodiment of this is presented in FIG. 7. There, window 31 is arranged in the center of the partially transmissive mirror 25, 27 and are formed by an opening.

At each partially transmissive mirror 25, 27, the microwave beam impinging thereon in the transmission direction S is divided into a part A1 directed to the fill substance 1 and a part A2 continuing in the transmission direction S.

Figure 8:
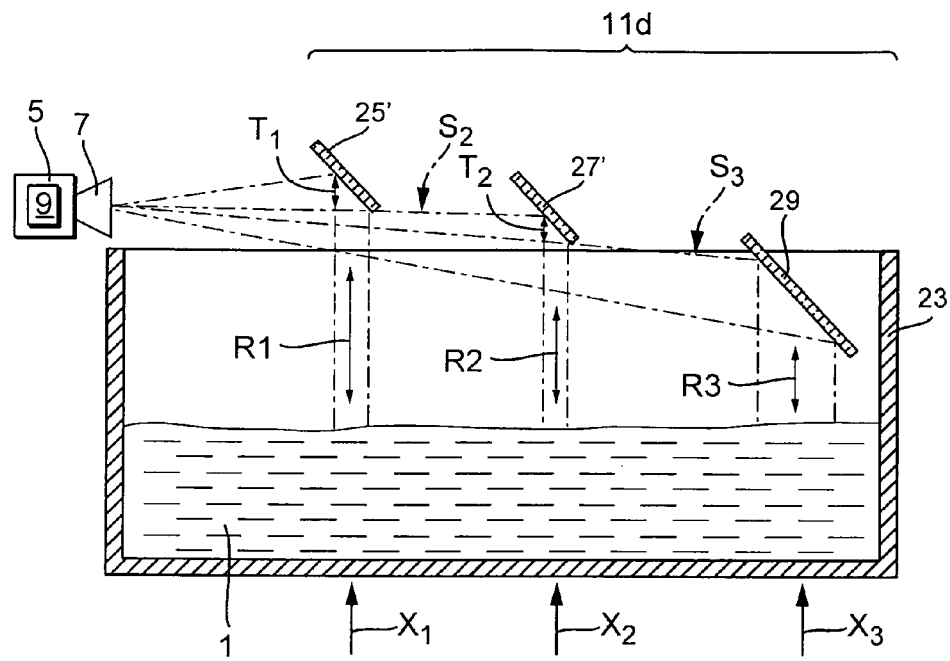
FIG. 8 an arrangement of the invention equipped with mirrors protruding into a section of the beam path, for measuring fill levels at different measuring locations.

Alternatively to this, instead of the partially transmissive mirrors 25, 27, mirror 25', 27' can be used, which are applied at the measuring locations X1, X2 above the fill substance 1 in the beam path in such a manner, that they cover in each case a section T1, T2 of the beam path. An example of an embodiment with a corresponding mirror arrangement 11d is shown in FIG. 8. Also the mirrors 25', 271 covering sections T1, T2 of the beam path effect splitting of the microwave beam radiated in the transmission direction S into parts R1, R2 impinging on the respective mirrors 25', 27' and reflected therefrom in the direction of the fill substance 1 and parts S2, S3 continuing past the respective mirrors 25', 27' in the transmission direction S. If a number of mirrors 25', 27' are arranged one after the other covering sections T1, T2 of the beam path, then the following mirrors in the transmission direction S 27' are arranged in such a manner, that they protrude into the beam path, which is formed by the continuing fractions S2 of the sent microwave beam continuing past the therebefore arranged mirrors 25' in the transmission direction S. Correspondingly, also the additional mirror 29 is so arranged, that the part S3 of the microwaves radiated past all mirrors 25', 27' covering sections T1, T2 of the beam path is reflected, as much as possible, completely by this mirror 29. This is implementable, for example, by the step shaped arrangement of the mirrors 25', 27', 29 shown in FIG. 8. Also here, the mirrors 25', 27' covering the sections T1, T2 of the beam path and the additional mirror 29 have an orientation, by which in the transmission direction S thereon impinging and thereon reflected microwaves are radiated at the measuring locations X1, X2, X3 in the direction of the fill substance 1. At the surface of the fill substance, there occurs then, in each case, a reflection, through which microwaves are reflected back to the mirrors 25', 27', 29. The respective mirrors 25', 27', 29 radiate these back reflected echoes then, in turn, counter to the transmission direction S, in the direction of the antenna 7.

Preferably also here, the mirrors 25, 27, 29, or the mirrors 25', 27', 29, arranged at the measuring locations X1, X2, X3 over the surface of the fill substance have at least one reference reflector 19, by which a small part TR1, TR2, TR3 of the microwaves incoming thereto in the transmission direction S is reflected back, directly counter to the transmission direction S. Suited as reference reflectors 19 are, also here, the reference reflectors 19a, 19b and 19c already explained on the basis of FIG. 5.

Also here, mirrors 27', 27, 29 arranged further removed from the antenna 7 have preferably a larger mirror area than mirrors 25, 27, 25', 27' arranged nearer to the antenna 7, wherein the distance between the antenna 7 and the respective mirrors 25, 27, 25', 27', 29 again equals the path distance traveled by the sent microwaves on the path from the antenna 7 to the mirrors 25, 27, 25', 27', 29 along the beam path determined by the mirror arrangement 11c, 11d.

Figure 4:
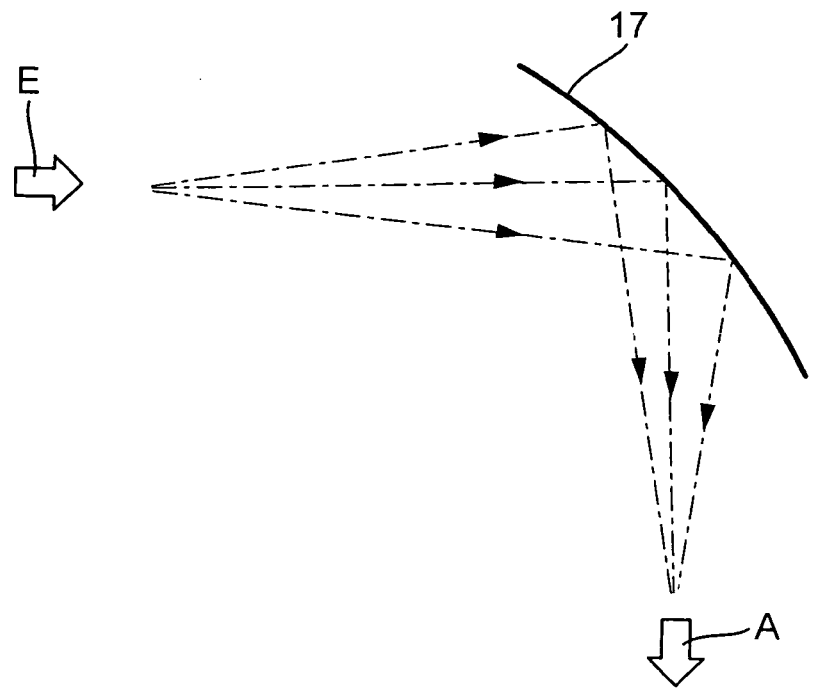
FIG. 4 a mirror with beam-focusing action.

If necessary, also here, instead of the planar mirrors 25, 27, 25', 27', 29, mirrors, such as e.g. the mirror 17 shown in FIG. 4, can be applied, which have a form effecting a focusing upon reflection of thereon impinging microwaves.

Figure 9:
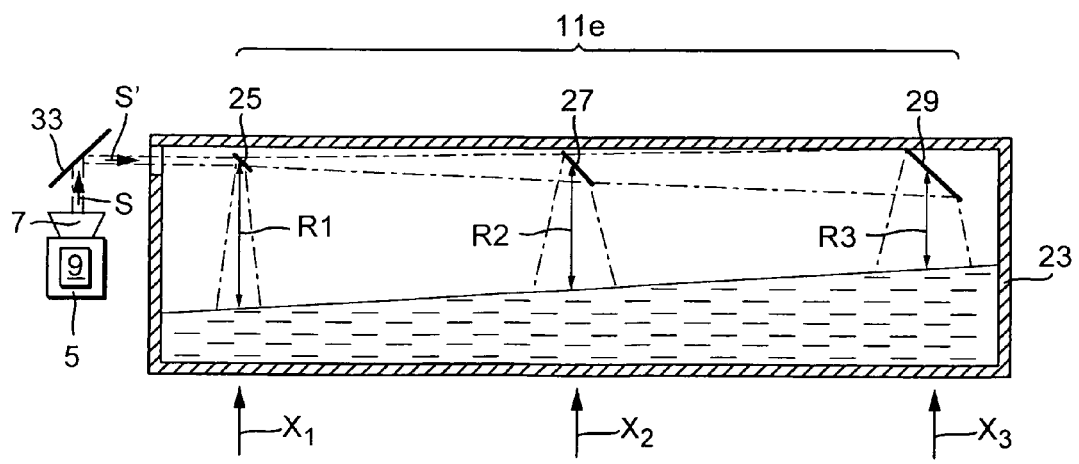
FIG. 9 an arrangement of the invention equipped with partially transmissive mirrors and a deflecting mirror arranged in the transmission direction of the antenna, for measuring fill levels at different measuring locations.
Figure 10:
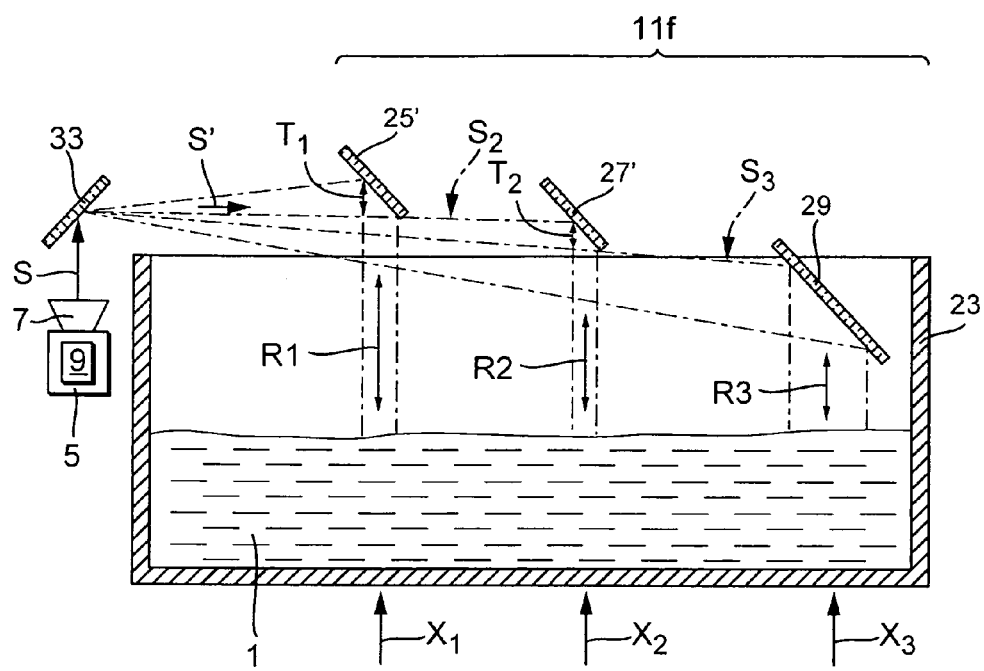
FIG. 10 an arrangement of the invention equipped with mirrors protruding into sections of the beam path and a deflecting mirror arranged in the transmission direction of the antenna, for measuring fill levels at different measuring locations.

Instead of the arrangements illustrated in FIGS. 6 and 8, in the case of which the antenna 7 is oriented in such a manner, that its transmission direction S extends above the fill substance 1 out over the fill substance 1, naturally also here, another antenna orientation can be selected. In that case, the mirror arrangements 11e, 11f include, such as shown in FIGS. 9 and 10, at least one additional deflecting mirror 33, which turns the microwaves transmitted from the antenna 7 in its transmission direction S to a beam direction S', which extends above the fill substance 1 out over the fill substance 1. The remaining construction of the arrangements is identical to the arrangements illustrated in FIGS. 6 and 8, wherein the mirrors 25, 27, 25', 27' and 29 are naturally now arranged along the axis defined by the beam direction S' at the measuring locations X1, X2, X3 above the fill substance. The echoes reflected at the surface of the fill substance back to the mirrors 25, 27, 25', 27', 29 are radiated from the mirrors 25, 27, 25', 27', 29 counter to the beam direction S' in the direction of the deflecting mirror 33, via which the thereon impinging microwaves are then radiated counter to the transmission direction S in the direction of the antenna 7.

In measurement operation, microwaves are transmitted from the antenna 7. The sent microwaves are divided via the mirror arrangement 11c, 11d, 11e, or 11f into a number of beam sections R1, R2, R3 corresponding to the number of mirrors 25, 27, 25', 27', 29 arranged at the predetermined measuring locations X1, X2, X3 above the fill substance 1. The beam sections R1, R2, R3 then impinge at the individual locations X1, X2, X3 on the surface of the fill substance determined by the positions of the mirrors 25, 27, 25', 27', 29 and are reflected there. The echoes of the individual beam sections R1, R2, R3 reflected at the respective measuring location X1, X2, X3 on the surface of the fill substance are guided via the mirror arrangement 11c, 11d, 11e, 11f back to the antenna 7. The antenna 7 receives, thus, a received signal, that represents a superpositioning of all echoes reflected back to the antenna 7. This received signal is fed to the measuring device 5 and converted by the measuring device electronics 9 into an echo function, which shows the amplitude of the received signal as a function of the travel time which has passed between the transmitting of the microwaves and the receiving of the respective echoes.

Figure 11:
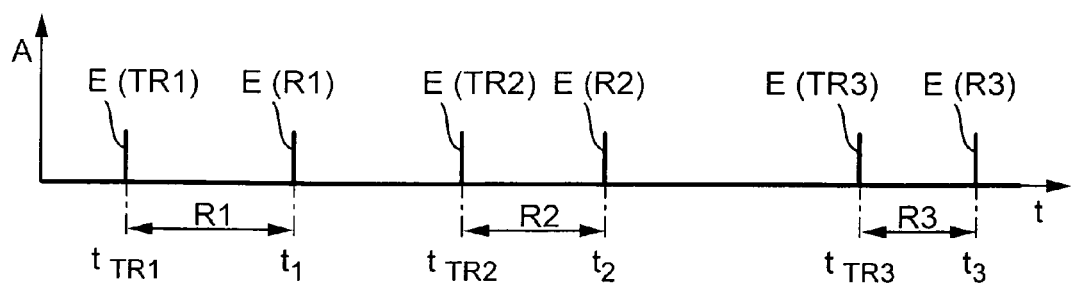
FIG. 11 a sketch of the principles of an echo function derived from a received signal.

FIG. 11 shows a sketch of the principles of such an echo function, in which only the maxima of the received signal are presented. The received signal corresponds to the received signal of an arrangement according to FIG. 6, 8, 9 or 10, in the case of which each of the mirrors 25, 27, 25', 27', 29 over the fill substance 1 is equipped with a reference reflector 19. As a result, the first maximum corresponds to a reflection TR1 on the reflector 19 of the first mirror 25, 25' and the second maximum is effected by the reflection of the first beam portion R1 on the surface of the fill substance at the measuring location X1 of the first mirror 25, 25'. The third maximum corresponds to a reflection TR2 on the reflector 19 of the second mirror 27 and the fourth maximum is effected by the reflection of the second beam portion R2 on the surface of the fill substance at the measuring location X2 of the second mirror 27, 27'. The fifth maximum corresponds to a reflection TR3 on the reflector 19 of the last mirror 29 and the sixth maximum is attributable to the reflection of the third beam portion R3 on the surface of the fill substance at the measuring location X3 of this additional mirror 29.

The travel times t1, t2, t3 of the echoes E(R1), E(R2), E(R3) received by the antenna 7 are ascertained, which the respective beam sections R1, R2, R3 and their echoes require for the path from the antenna 7 to the respective sites X1, X2, X3 on the surface of the fill substance and back to the antenna 7, and, on the basis of these travel times t1, t2, t3 and the positions of the respective mirrors 25, 27, 25', 27', 29 arranged at the measuring locations X1, X2, X3 above the surface of the fill substance, fill level at the respective measuring locations X1, X2, X3 is ascertained.

In such case, the reference echoes E(TR1), E(TR2), E(TR3) produced by the reference reflectors 19 facilitate not only the detecting and finding of the wanted echos E(R1), E(R2), E(R3) reflected at the measuring locations X1, X2, X3 on the surface of the fill substance, but, also, the following fill level determination. It suffices, in this case, to determine the travel-time difference between the travel time $t_{R1}$, $t_{R2}$, $t_{R3}$ of the relevant reference echo E(TR1), E(TR2), E(TR3) and the travel time t1, t2, t3 of the wanted echo E(R1), E(R2), E(R3) associated with the same measuring location X1, X2, X3. From this, there is obtained, on the basis of the propagation velocity of the microwaves, directly, the distances between the respective reflectors 19 of the mirrors 25, 27, 29 and the surface of the fill substance and therewith the fill level. In the case of eccentrically arranged reflectors 19, there is to be included, in given cases, an additive correction factor into the calculation, which takes into consideration the eccentric position of the reflector 19 on the particular mirror 25, 27, 29.

With the mirror arrangements 11c, 11d, 11e, 11f illustrated in FIGS. 6, 8, 9 and 10, an option is, in analogous manner, to measure, with a single fill-level measuring device 5, also fill levels in containers at different locations relative to one another, neighboring one another along a shared axis, one after the other. For this, the individual mirrors 25, 27, 25', 27', 29 are arranged distributed correspondingly on the individual containers.

LIST OF REFERENCE CHARACTERS

1 fill substance
3 container
5 fill-level measuring device
7 antenna
9 measuring device electronics
11 mirror arrangement
11a, 11b,
11c, 11d,
11e, 11f
13 mirror
15 deflecting mirror
17 mirror
19 reference reflector
19a, 19b, 19c
21 reflector surface
23 container
25 first partially transmissive mirror
25' mirror partially covering the beam path
27 second partially transmissive mirror
27' mirror partially covering the beam path
29 additional mirror
31 window
33 deflecting mirror

The invention claimed is:

1. An arrangement for measuring fill levels of fill substances located in containers at different predetermined measuring locations, comprising:
   a fill level measuring device arranged removed from the measuring locations, and operating with microwaves according to the travel time principle, said fill-level measuring device having an antenna for directed sending of microwaves and for receiving microwaves;
   a mirror arrangement, which has mirrors arranged at the measuring locations above the fill substance, and which transmits onto the surface of the fill substance, at the measuring locations, microwaves sent from said antenna in their transmission direction and which transmits back to said antenna their echoes reflected on the surface of the fill substance; and
   a measuring device electronics, to which are fed, in measurement operation, received signals received with said antenna, and which, on the basis of the received signals, ascertains the travel times of the microwaves reflected at the measuring locations on the surface of the fill substance and ascertains therefrom, on the basis of the positions of said mirror arrangement arranged above the fill substance, the present fill levels at the measuring locations.

2. The arrangement as claimed in claim 1, wherein:
said antenna is arranged outside the container above the fill substance, and is oriented in such a manner, that it radiates, in measurement operation, microwaves in a transmission direction, which extends out over the surface of the fill substance;
said mirrors include a single mirror arranged at the measuring location above the fill substance, on which microwaves radiated in the transmission direction impinge in measurement operation, and which is arranged inclined relative to the transmission direction in such a manner, that microwaves impinging on said single mirror in the transmission direction are reflected therefrom at the measuring location onto the surface of the fill substance, and that their echoes reflected on the surface of the fill substance are transmitted by said single mirror to said antenna.

3. The arrangement as claimed in claim 1, wherein:
certain of said mirrors have a form, which, in the reflection of microwaves impinging thereon, effect a focusing of the microwaves.

\* \* \* \* \*